United States Patent [19]
Gobell et al.

[11] Patent Number: 5,707,186
[45] Date of Patent: Jan. 13, 1998

[54] CHUCK WITH AN INTEGRATED ROTARY UNION FOR FLUID FLOW

[75] Inventors: Jürgen Gobell, Brechen; Stephan Ott, Wiesbaden, both of Germany

[73] Assignee: Gat Gesellschaft Fur Antriebstechnik mbH, Wiesbaden, Germany

[21] Appl. No.: 724,015

[22] Filed: Sep. 27, 1996

[30] Foreign Application Priority Data

Nov. 23, 1995 [DE] Germany ............ 195 43 612.1

[51] Int. Cl.$^6$ ........................................... B23C 5/28
[52] U.S. Cl. ................... 409/136; 137/580; 137/798; 285/94; 285/98; 285/101; 408/59; 409/233
[58] Field of Search ............................ 408/56, 57, 59; 409/136, 233, 231; 137/580, 798; 285/94, 98, 101

[56] References Cited

U.S. PATENT DOCUMENTS

| | | | |
|---|---|---|---|
| 4,692,074 | 9/1987 | Smith et al. | 409/233 |
| 4,726,397 | 2/1988 | Stich | 137/580 |
| 4,863,324 | 9/1989 | Blessing | 409/233 |
| 4,925,348 | 5/1990 | Krusi | 409/233 |
| 4,957,398 | 9/1990 | Schneider et al. | 409/233 |
| 4,976,282 | 12/1990 | Kubala | 137/580 |
| 5,072,948 | 12/1991 | Kostrzewski | 277/2 |
| 5,327,979 | 7/1994 | Du et al. | 408/57 |
| 5,439,029 | 8/1995 | Becker | 137/580 |

FOREIGN PATENT DOCUMENTS 4103376  6/1982  Germany.

Primary Examiner—Daniel W. Howell
Assistant Examiner—Christopher Kirkman
Attorney, Agent, or Firm—Herbert Dubno; Andrew Wilford

[57] ABSTRACT

A chuck-actuating spindle assembly has a hollow shaft extending along and rotatable about an axis, a clamping bar parallel to and rotatable with the shaft and axially displaceable relative to the shaft to clamp and release an object carried on the shaft, and a rotary union for transmitting a fluid to the object carried on the shaft. The union has in turn a union housing nonrotatable about the axis, an annular bar seal face on the clamping bar, and a sealing member axially movable in the union housing independently of the bar face, forming a pressurizable space with the union housing, and having an annular member seal face axially confronting and axially engageable with the bar seal face. The seal faces form a portion of a passage extending from the space along the bar and shaft to the object. Rotation of the sealing member about the axis relative to the union housing is inhibited and the member is braced against the union housing axially away from the bar seal face with a predetermined biasing force. The space can be pressurized with a fluid and to press the member face against the bar face so that the fluid moves along the passage to the object.

11 Claims, 3 Drawing Sheets

CHUCK WITH AN INTEGRATED ROTARY UNION FOR FLUID FLOW

BACKGROUND OF THE INVENTION

1. Field of the Invention

The present invention relates to a chuck actuating spindle with a rotary union for fluid flow for machines rotating at a high rotational frequency, particularly for machine tools, comprising a hollow shaft which is rotatable about a central axis and designed for high rotational frequencies and a clamping element which is provided on or in the shaft, is rotatable therewith and is axially movable for clamping and releasing.

2. Description of Prior Developments

Such chucks and their design are known per se and to that extent do not differ from chucks with rotary unions for low rotational frequencies. Such chucks are commonly used on machine tools which have a rotatable shaft on the free end of which may be clamped, by means of a special clamping mechanism which is not subject of the present invention, a tool (and possibly also a workpiece), and which rotate at high rotational frequencies. By the engagement of a tool with a workpiece are not only produced chips but also considerable heat energy is generated by friction. Both the heat generated by friction and the produced chips must be removed, as quickly as possible, from the working area of the tool so as not to damage it. The removal of chips, e.g. during milling, presents, in general, no problem, but it is not so easy with drilling. Usually either pressurised air or a water-oil emulsion is used which is directly sprayed into the working region of the tool and removes thereby both the chips and heat energy. While it is possible in many machining process, particularly milling, to supply pressurised air or a liquid cooling and flushing medium from outside, there are other machining processes, e.g. drilling, in which supplying cooling and flushing medium only from outside is not sufficient for the removal of the produced chips and heat energy. In such fields of application tools designed for internal supply of coolant are used. Such tools have a central, axial longitudinal bore which ends somewhere in the vicinity of the working area of the tool in one or more outlet openings. Also the clamping mechanism and the shaft must therefore be designed for internal supply of coolant, i.e. both the clamping mechanism and the shaft are hollow and allow thereby supply of coolant along the central axis, where this cooling and flushing medium may enter at the rear end of the tool and leave through the front openings. It is understood that such machine tools are not limited to use in areas with difficult access but may also be used in easily accessible areas because this often enables considerable reduction of the amount of cooling and flushing medium needed.

Such machine tools must have a suitable rotary union because the cooling and flushing medium are stored in a tank, which is obviously not rotatable with the shaft, and from there they must be supplied into the rotating shaft. For this purpose are mostly used rotary unions having sealing faces sliding on each other and extending substantially perpendicularly to the axis of rotation.

So as to enable fast, automatic changing of tools, many such machine tools have, in addition, chucks in which a specially adapted tool shank must be grasped and clamped by a clamping mechanism, while the necessary clamping force is provided in many cases by a so-called drawbar which extends along the axis of rotation inside the shaft and which is so connected to the clamping mechanism at the free end of the shaft that clamping and releasing are carried out merely by a corresponding axial movement of the drawbar. Independently of the special design as a drawbar, the present invention relates to all chucks with rotary unions in which a clamping element for clamping and releasing of the relevant mechanism performs an axial movement.

In view of the manufacturing tolerances and also due to the unavoidable wear both of tools and tool shafts and also parts of the clamping mechanism and the chuck itself, it inevitably follows that the axial position of the clamping element varies with various clamped tools or simply during the use of the chuck gradually changes. This means for the rotary union, that it always ensure a fluid-tight positioning of the slidable sealing faces of the rotary union in spite of the different axial position of the clamping element which is situated on or in the shaft.

All known chucks with rotary unions have considerable disadvantages. They are either exceptionally prone to wear, i.e. at high rotational frequencies the slidable sealings become in a short time unusable and must be replaced, or they are from the start not suitable for high rotational frequencies. This applies particularly to such rotary unions in which the slidable sealing faces are provided on axially non-movable parts, which is regularly connected with an increase of the rotating masses and/or their spacing from bearings and which are therefore not suitable for high rotational frequencies. As regards the present application, the region of rotational frequencies between 15000 and 30000 rev/min, particularly between 20000 and 30000 rev/min, are considered to be a region of high rotational frequencies. This, naturally, does not mean that the present invention cannot be used for machines rotating at lower frequencies or also at higher frequencies. It could be stated, in general, that chucks with rotary unions of the above described kind which would be suitable for frequencies of around 20000 rev/min without causing excessive wear of the slidable sealings or bearings are not known.

OBJECT OF THE INVENTION

In contrast to this state of the art, the aim of the present invention is to devise a chuck with a rotary union of the above mentioned kind which is suitable for high rotational frequencies and allows for the possibility of varying axial positions of a clamping element without the sealing faces or bearings of the rotating shaft being subjected to excessive loading which would result in high wear.

SUMMARY OF THE INVENTION

This aim is solved in that the rotary union is integrated in the chuck and has a slidable sealing face on the clamping element or a member which rotates with it and is firmly connected thereto, and that a second slidable sealing face which faces the first sealing face is provided on a sealing member which is axially movable and is not rotatable and is biased away from the sealing contact with the first sealing face, means being provided which, when pressure is admitted to the rotary union by the supplied fluid, can bring the axially movable sealing member against its biasing to a sealing contact with the first sealing face of the clamping element.

The axial movability of the sealing member comprising the second slidable sealing face and its biasing away from the sealing contact causes that, in general, the slidable sealing faces are spaced from each other axially and are not in mutual contact. This avoids particularly high frictional forces which could be otherwise generated when the position of the second slidable sealing face is axially determined, while the first slidable sealing face assumes varying axial positions due to manufacturing tolerances and tolerances caused by wear. When the clamping mechanism is worn or assumes varying positions as a consequence of normal manufacturing tolerances, only the spacing provided between the two slidable sealing faces increases or decreases as long as the slidable sealing is not subjected to pressure by the supplied medium. Only when pressure is admitted to the slidable sealing, the second slidable sealing face moves in the direction to the first sliding sealing face until they are in mutual contact and, when the pressure increases further, corresponding devices, such as a biased non-return valve, cause that the supplied medium is finally guided from the entry of the slidable sealing into the shaft or drawbar, while in this state the mentioned sealing faces already bear sealingly against each other. A shaft bearing may be at the same time at a relatively short axial distance from the slidable sealing faces and therefore arranged nearer to the transition from the rotating to the stationary machine parts than would be the case if the sealing faces were arranged on the other side of the axially movable clamping element.

In a preferred embodiment of the invention, the device by means of which the second slidable sealing face is on admission of pressure brought into contact with the first sliding sealing face is a non-return valve which is biased with a force greater than the biasing force which forces the second slidable sealing face away from the first slidable sealing face. This ensures that when pressure is admitted, first the contact of the sealing faces is established and after that the non-return valve opens. The sealing faces are than exposed only to the difference of the mentioned biasing forces.

Also preferred is an embodiment of the invention in which the sealing member comprising the second sealing face has some clearance for tilting relative to the axis of rotation. This also enables compensation for manufacturing tolerances and ensures that both the slidable sealing faces bear against each other on a large surface and flush irrespective of such tolerances or misalignment. In this connection is also preferred an embodiment of the invention in which the sealing member containing the slidable sealing face has at its end facing away from the sealing face a further sealing face or a sealing transition between a frusto conical face and an at least partially spherical face. Such transitions between a spherical face and a cone produce a linear sealing contact, while the member comprising the spherical face may be tilted relative to the member comprising the conical face by greater angles and vice versa, without the linear sealing contact being lost. In the case of a small misalignment, which is in practice unavoidable, this embodiment ensures that the sealing member can rotate about an axis of rotation of the shaft displaced in parallel to its axis of symmetry or to the axis of symmetry of the whole rotary union, without the contact of any sealing faces of the rotary union being thereby negatively influenced.

In this embodiment the non-return valve is preferably situated in the further sealing member which, looking in the direction of flow, is situated upstream of the dome/cone transition.

The advantages of the present invention reside primarily in that relatively high rotational frequencies of the shaft are possible without noticing excessive wear of the slidable sealing faces and without large leakage. A chuck equipped with such a slidable sealing is therefore suitable especially for the region of high rotational frequencies between 15000 and 30000 rev/min, particularly above 20000 rev/min.

In connection therewith it is particularly advantageous when the rotary union is integrated in components which provide internal friction-type connection between the shaft and the drawbar of the chuck. The drawbar bears on the shaft in the direction of clamping preferably by means of a spring assembly or similar arrangement. The direction of clamping is usually the direction axially inwardly to the rotary union. If the drawbar is otherwise uninfluenced, the spring assembly, which is supported on the one hand by the shaft and on the other hand by the drawbar, presses the drawbar axially inwards, so that the sealing faces, one of which is provided at the end of the drawbar, are brought close to each other but as yet out of contact, because the sealing face of the sealing member of the rotary union to which pressure is not admitted is biased away from the sealing contact to provide some clearance for the axial end position of the first slidable sealing face on the drawbar. Actuation of the drawbar, i.e. releasing of the clamping mechanism, is performed in general hydraulically, or possibly also pneumatically. The term internal friction-type connection is used when the control means engages directly on the one hand the shaft and on the other hand the drawbar, without recourse to the mounting of the shaft in bearings. This is in connection with the present invention relatively important because the bearings of shafts which rotate at high revolutions should not be exposed, as far as possible, to the high axial loads which are produced on actuation of the drawbar. The bearings of the shaft are therefore never subjected to tensional forces acting between the shaft and the drawbar.

Such control means with an internal friction-type connection comprises, according to the invention, an axially movable cylinder which is axially guided in a stationary machine part which contains also one or more bearings for the shaft. Inside the piston is axially freely movable an annular piston. The annular piston has on the inside engagement elements for mutual engagement with the shaft or the projections on the shaft, which in certain angular position enter into engagement, preferably in the manner of a bayonet engagement, with these engagement elements, so that the annular piston may bear in axial direction, namely in both axial directions, on the outwardly extending projections of the shaft. The shaft remains meanwhile freely rotatable in the annular piston, i.e. the corresponding engagement elements and projections engage with each other with a clearance. The annular piston is an annular piston to which is admitted pressure axially from two sides. The relevant cylinder of the annular piston is firmly connected to a control element for the drawbar and also to the housing of the rotary union. The annular piston is axially movable only to a limited extent, because its engagement elements engage the outwardly extending projections of the shaft in both axial directions as soon as the movement of the piston overcomes the clearance between the projections of the shaft and the engagement elements of the piston. The shaft itself has, in general, a firm axial position which is also predetermined by the high-speed bearings of the shaft. If pressure is admitted to the piston within the cylinder, the piston bears against the projections of the shaft and exerts corresponding counterforce on the axially movable cylinder. The latter carries with it the control element for the drawbar and simultaneously also the rotary union, so that the spacing of the sealing faces of the rotary union is reduced by the predetermined clearance between the control element and the drawbar and between the piston and the engagement elements of the shaft. However a residual clearance still remains between the sealing faces, this clearance being overcome only when pressure is admitted to the rotary union by the axial movement of a sealing member of the rotary union.

This completes the friction-type connection between the shaft, annular piston, cylinder and control element, without any bearings of the shaft or sealing faces of the rotary union being interposed or being acted upon by tensional forces.

The arrangement according to the invention has the advantage that all parts surrounding the upper end of the shaft and the drawbar, namely the annular piston, the cylinder with the control element and the housing for the rotary union and the rotary union itself are axially movable and partly also movable with respect to each other, but they are not rotatable. The rotating parts are exclusively the shaft and the drawbar, while a bearing of the shaft should be situated as near as possible to the projections of the shaft or near the annular piston, to ensure support of the shaft near the fast rotating upper end of the shaft and drawbar. By this are achieved very advantageous conditions for the bearings and very small loading of the bearings, because the masses of the rotating parts are correspondingly small. This is at the same time combined with an internal friction-type connection so as to largely avoid loading of the bearings also during clamping and releasing, and finally also the rotary connection is correspondingly adapted and altogether axially movable with the cylinder and also inside its housing, so that the loading of the sliding seal is kept at a minimum and long service life at high rotational frequencies is achieved.

The aforementioned objects, features and advantages of the invention will, in part, be pointed out with particularity and will, in part, become obvious from the following more detailed description of a preferred embodiment of the invention, taken in conjunction with the accompanying diagrammatic drawings, which form an integral part thereof.

BRIEF DESCRIPTION OF THE DRAWINGS

In the Drawings:

FIG. 1A shows the detail indicated at IA in FIG. 1, FIG. 2A shows the detail indicated at IIA in FIG. 2.

In the various Figures of the drawings, like reference characters designate like parts.

DETAILED DESCRIPTION OF THE PREFERRED EMBODIMENT

Figure 1:
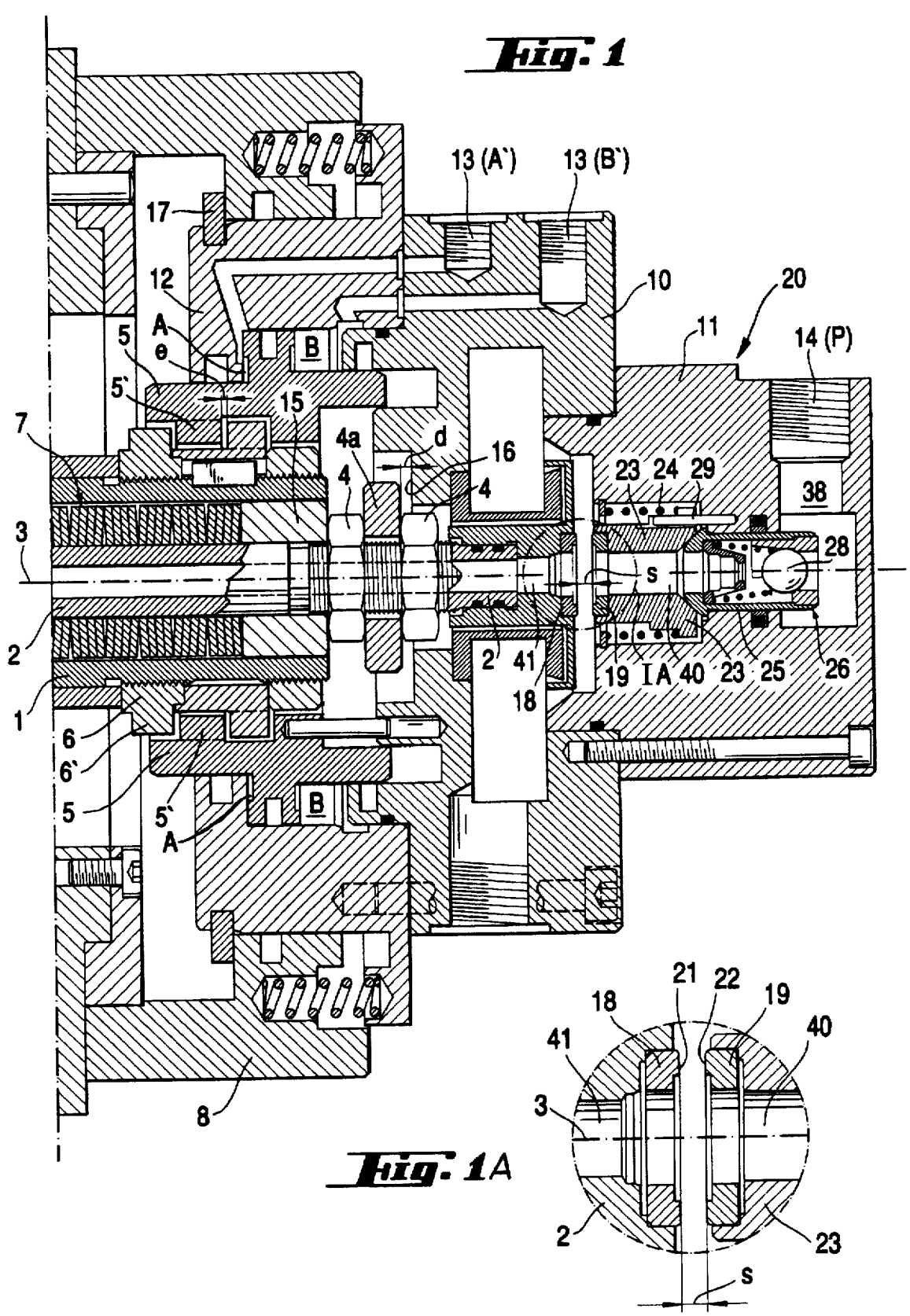
FIG. 1 shows a part of a machine tool with the upper end of a shaft and a drawbar, and also control means for the drawbar and a rotary union at the end of the drawbar.

FIG. 1 shows a rotatable shaft 1 and a drawbar 2 which is situated inside the shaft 1. The drawbar 2 is disposed in the shaft 1 over most of its length without clearance with a sliding fit and is near its upper or right-hand end biased to the right by a spring assembly 7. In this description, when referring to FIG. 1, the terms "right-hand", "upper" and "axially inward" are used synonymously and indicate the same direction. The left-hand end of the shaft 1 and also of the drawbar 2 is not illustrated. At the left-hand or lower end is situated a clamping mechanism which comprises a holder for tools or workpieces which are firmly held by the clamping mechanism, which, in turn, is operated by the drawbar 2. The illustrated right-hand end of the shaft 1 is radially widened to provide space for the spring assembly 7 which is supported by a corresponding, radially inwardly extending shoulder of the shaft 1 (the shoulder is not shown). The right-hand or upper end of the spring assembly 7 bears against a sleeve 15 which is secured by nuts 4 on the drawbar 2. The nuts 4 allow axial displacement and adjustment for the setting of the sleeve 15. The nuts 4, or a corresponding washer 4a between two nuts 4, serve at the same time as an engagement face for control means, as will be described later.

A ring 6 provided with projections 6' is firmly connected to the shaft 1 and secured axially thereon. Inwardly extending projections 5' or engagement elements on a piston 5 are in a kind of bayonet engagement with the projections 6', while between the projections 6' and the corresponding projections 5' or engagement elements of the piston 5 is an adequate clearance e to enable in an end position of the piston 5, free rotation of the shaft 1 with the ring 6 with respect to the piston 5.

The piston 5 is surrounded by a cylinder 12 which is guided so that it can axially move within a stationary machine part 8. The cylinder 12 is therefore movable in axial direction within the stationary machine part 8 and is fixed to a control element 10 which includes an engagement face 16 for engagement with the washer 4a at the right-hand end of the drawbar 2. To the control element 10 is firmly connected a housing 11 for the rotary union 20.

Figure 2:
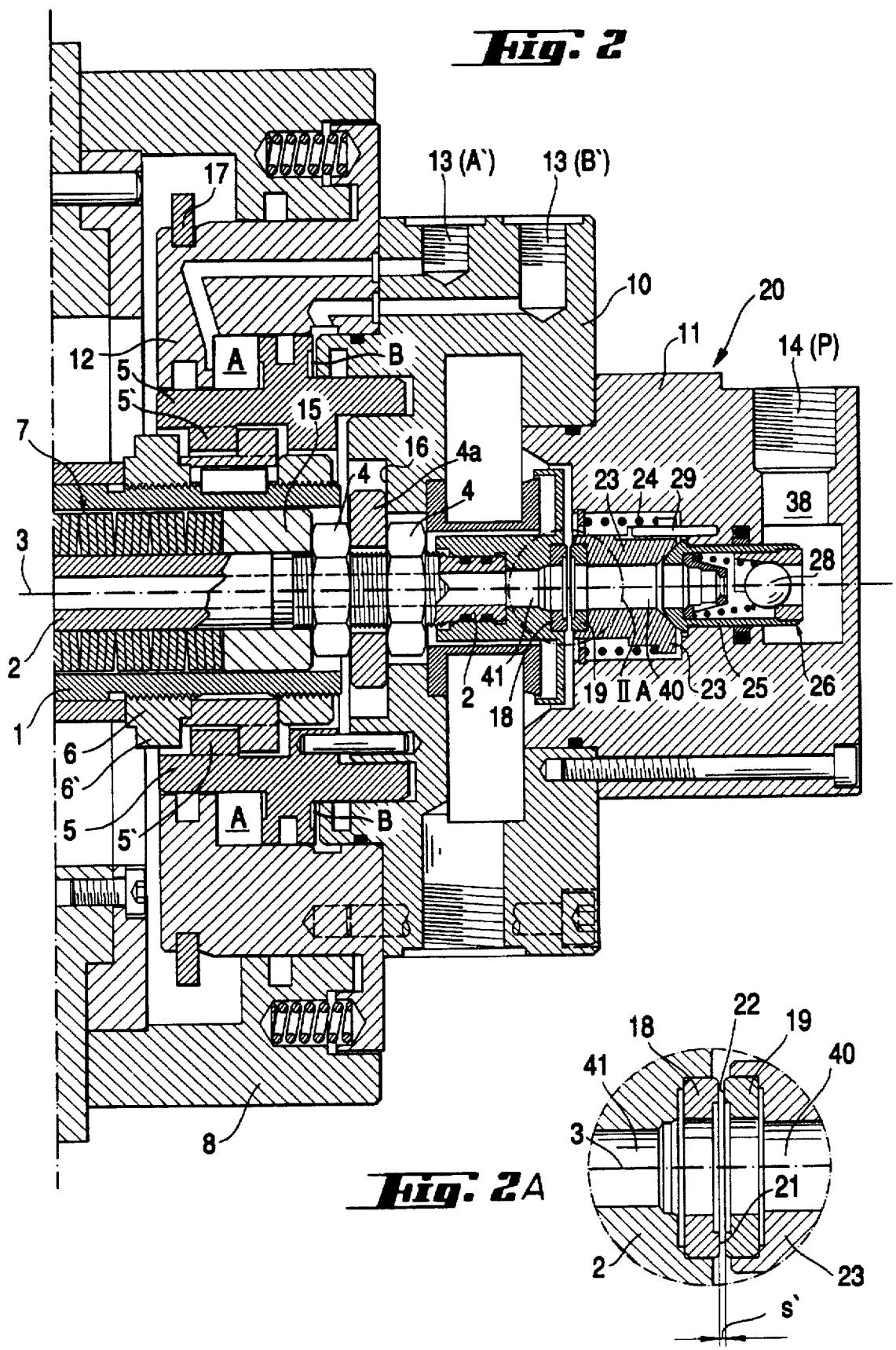
FIG. 2 shows the part according to FIG. 1 in a different operational position.

First the releasing and clamping of the chuck according to the invention will be described. The terms "releasing" and "clamping" relate to the relevant processes on a tool or workpiece which is held on the non-illustrated end of the shaft 1 by means of a clamping mechanism which is also not shown, this mechanism being operated via the drawbar 2 and the elements shown in FIGS. 1 and 2. The individual elements are shown in FIG. 1 such, that their position corresponds to the clamped state of the clamping mechanism, while the positions in FIG. 2 show the released position, which corresponds to the drawbar 2 displaced axially to the left against the force of the spring assembly 7. Switching over from one to the other position is performed by the admission of pressure into one of two annular pressure chambers A, B between the piston 5 and cylinder 12, of which the chamber B is visible in FIG. 1 and the chamber A is visible in FIG. 2. The corresponding hydraulic control connections for the two chambers are marked 13 (A') and 13 (B'), respectively.

Starting from the clamping position shown in FIG. 1: For the releasing of the clamping mechanism, pressure is admitted into the annular chamber A while pressure is released from the annular chamber B. This causes first a small axial inward motion (to the right) of the annular piston 5, corresponding to the clearance e between the projections 5' on the annular piston 5 and the projections 6' on the ring 6, as is clearly apparent in FIG. 1. Then the projections 5' and projections 6' bear against each other and, instead of the annular piston 5, the cylinder 12 now moves axially outwards (to the left) and carries with it both the control element 10 and the housing 11 of the rotary union 20. As soon as the clearance d, visible in the upper part of FIG. 1 between the engagement face 16 and the washer 4a, is overcome by the axial movement of the control element 10 outwards, the element 12 bears against the washer 4a and, when the pressure in the pressure chamber A is sufficiently high, presses thereby the drawbar 2 against the force of the spring assembly 7 to the left. The movement of the drawbar 2 to the left or axially outwards operates the clamping mechanism (not shown) such that a tool or a workpiece is released.

For the clamping of the clamping mechanism, e.g. after insertion of a new tool, at first only the pressure in the pressure chamber A is released so that the spring assembly 7 moves the drawbar 2, and with it also the control element 10 and the cylinder 12, to the right, whereby the pressure chamber A is emptied. The axial inward motion of the drawbar 2 is limited only by the clamping mechanism (not shown). As can be seen on the clearance d between the engagement face 16 and the washer 4a and also on the clearance e between the projections 5' on the annular piston 5 and the projections 6' of the ring 6 on the shaft 1, the end stage, shown in FIG. 1, is not yet reached by the axial inward motion of the spring assembly 7, even though the spring assembly 7 alone provides the clamping force for the object to be clamped. Because the shaft 1 and the drawbar 2 rotate with respect to the parts which surround them, e.g. with respect to the annular piston 5 and the control element 10, a corresponding clearance must again be established between these parts. This clearance is obtained for the control element 10 by a resilient mounting of the cylinder 12 by means of which the cylinder 12 is biased to the right or upwards. A right-hand or upper limit stop of the cylinder 12 on the stationary machine part 8 is defined by a snap ring 17. The clearance between the inner projections 5' on the piston 5 and the outer projections 6' of the ring 6 on the shaft 1 is then obtained in that pressure is admitted to the annular chamber B, so that the outer axial annular face of the annular piston 5, which delimits the annular chambers A and B, engages the bottom of the annular chamber A. This position is finally shown in FIG. 1, and the shaft 1 is then, together with the drawbar 2 and all parts fixed thereon, freely rotatable with respect to the annular piston 5 and also with respect to the control element 10, the rotary union 20 and its housing 11.

In an embodiment which is not shown it is also possible to use spring force to generate the force exerted by the pressure in chamber B.

The engagement or the function of the slidable disks 18, 19 with their slidable sealing faces 21, 22 will now be dealt with in greater detail. As is shown in FIGS. 1 and 2 and also FIGS. 1A and 2A, the slidable disks 18, 19 are integrated, respectively, as separate components in the drawbar 2 and a first sealing member 23. It would have been possible, however, to correspondingly arrange or possibly treat, e.g. by providing a special coating the end face of the drawbar 2 and of the sealing member 23 so that they could serve as slidable sealing faces 21, 22.

The slidable sealing face 22 of the slidable disk 19 arranged in the first sealing member 23 is situated opposite the slidable sealing face 21 of the slidable disk 18 of the drawbar 2 with the clearance s shown in FIGS. 1 and 1A, the first sealing member 23 being resiliently biased to the right in axial direction. When no pressure is admitted to the rotary union 20, the clearance s sets itself. This clearance s may vary and depends particularly on the circumstance whether the clamping mechanism accurately determined the axial position of the drawbar 2 in the clamped state or whether this position more or less varies due to manufacturing tolerances or in dependence on the tool to be clamped or its wear. The two sealing faces 21 and 22 are, in operation, engaged together by pressurizing the connection 14 with a cooling or flushing fluid at pressure P.

Figure 3:
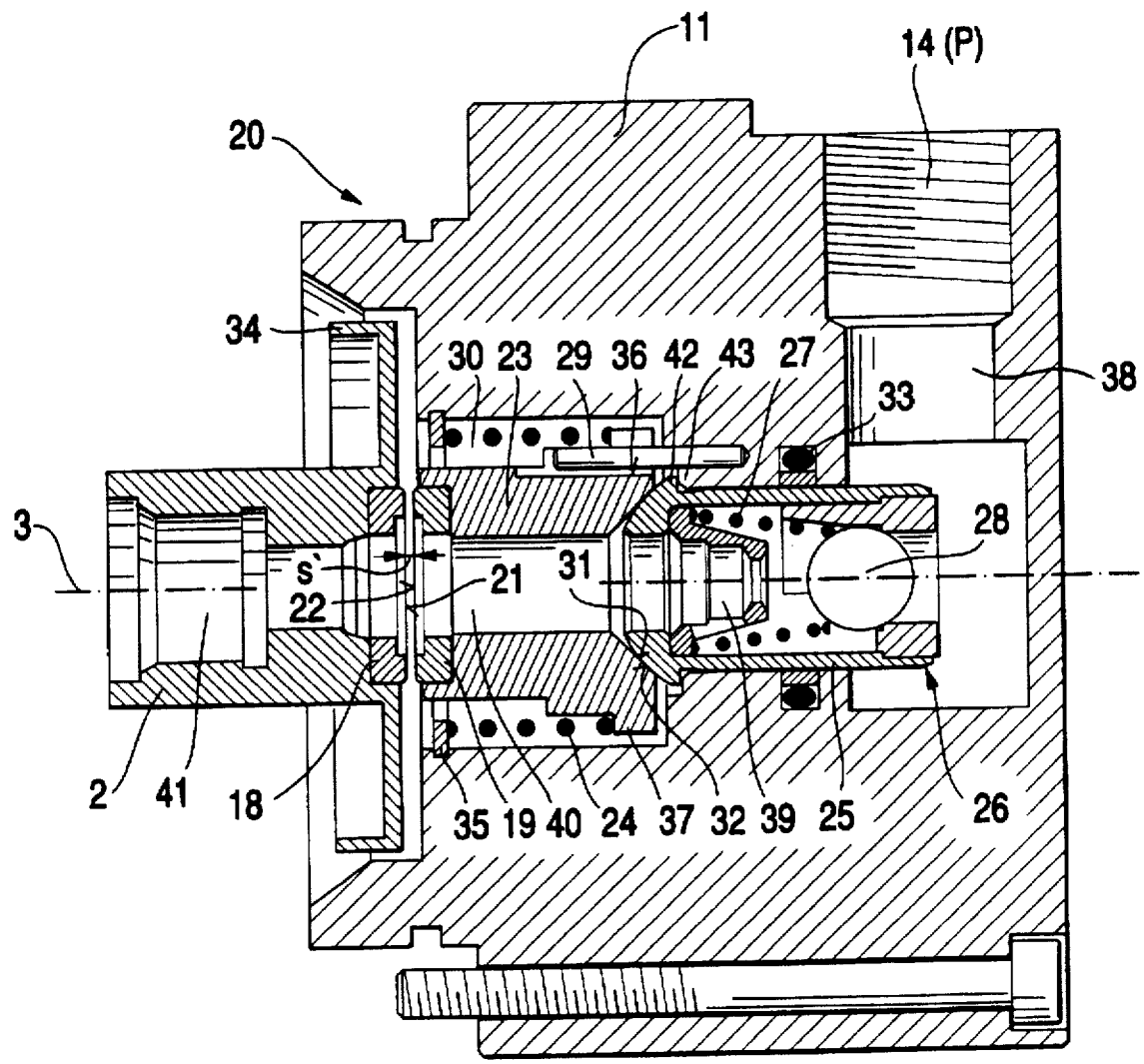
FIG. 3 shows the rotary union alone.

As is apparent from FIGS. 1, 2 and 3, a check or non-return valve 26 is situated in a cylindrical housing of a second sealing member (piston) 25 which is accommodated axially displaceably in the housing 11 of the rotary union 20. The front end of the second sealing member 25 has the shape of a circular cut-out from the surface of a sphere (spherical cap). The first sealing member 23 has on its right-hand end, which faces the second sealing member 25, a frusto conical face, which forms, together with the spherical face on the member 25, a seal. This arrangement allows for a small displacement of the member 23 with respect to the member 25 relative to their common axis 3, without the linear sealing engagement between the spherical face and the conical face being interrupted. This further allows the first sealing member 23 to be not only axially movably mounted by means of guide pins 29 but allows also small tilting of the sealing member 23 relative to the axis 3. This should ensure that both the slidable sealing faces 21, 22 bear on each other always flatly and flush.

The two sealing faces 21, 22 of the slidable disks 18, 19 get into mutual contact when the pressure P is admitted to the connection 14 is sufficiently high. By this pressure P, which acts both on the ball 28 of the non-return valve 26 and the end faces of the second sealing member 25, the member 25 is pressed in axial direction to the left and presses thereby also the other sealing member 23 against the force of the spring 24 to cause contact of the sealing faces 21, 22. The counter-force provided by the spring 24 is smaller than the force which is needed to open the non-return valve 26 by the compression of the spring 27. After the contact of the sealing faces 21, 22 has been established, the non-return valve 26 is opened when the pressure P further increases. The supplied fluid may then flow freely through the passage from inside of the hollow drawbar 2 from the connection 14 to the tool or workpiece.

When no pressure is admitted, the sealing faces 21, 22 do not contact each other. The reason for this is that the clearance s between the sealing faces 21, 22 is greater than the clearance d and the clearence e together. When the clamping mechanism is actuated by the admission of pressure into the annular chamber A, the piston 5 first overcomes the clearance e before also the (larger) clearance d between the engagement face 16 and the washer 4a is overcome. Only now is the drawbar 2 moved axially outwards. This happens, in this case, independently of the admission of the pressure P from the connection 14. The result of the resilient mounting of the sealing members is that, when the pressure P is not admitted, there continues to be the clearance s' (FIG. 2A) between the sealing faces 21, 22. This avoids damage to the sealing faces 21, 22. A cooling or flushing medium may be supplied at any time through the connection 14, regardless of whether the drawbar 2 is in a tensioned or relaxed state. The clearance between the sealing faces 21, 22 in the two different clamping states of the chuck (and without admission of pressure to the rotary union) is particularly clearly visible in the detailed view according to FIGS. 1A and 2A.

In FIG. 3 is again illustrated the rotary union 20 together with the housing 11 and a sealing ring provided with the slidable disks 18, 19. The individual components are marked in the same way as in FIG. 1, so that reference may be made to the description of FIG. 1 for this purpose.

In FIG. 3 is shown again the housing 11 of the rotary union 20. In the left-hand part of the Figure can also be seen the end of the drawbar 2, while this part 2 in FIG. 2 may also be a sleeve threaded on the drawbar 2 or similar means. Arrangement, shape and function of the slidable disks 18, 19 with their sealing faces 21, 22 is that described in connection with FIG. 1.

The radially extending part 34 on the right-hand end of the drawbar or sleeve 2 is part of a labyrinth seal, which will not be described.

The rotary union 20 proper, which is situated in the housing 11, comprises the two sealing members 23 and 25 which are in mutual contact through a dome-shaped sealing face 32 and a frusto conical sealing face 31. Both the members 23 and 25 are axially movable in the housing 11, the second sealing member 25 having a narrow sliding fit and being also sealed on the outside by an elastic seal ring 33. In contrast, the sealing member 23 is received in a bore whose inner diameter is regionally greater, while in the annular chamber 30 formed in this way are situated the biasing spring 24 and the guiding pins 29. The guiding pins 29 are firmly anchored in bores parallel to the axis; at least three, preferably six or more such guiding pins 29 should be provided. The first sealing member 23 has on the outside axially extending grooves 36 in which are partly received the guiding pins 29. The guiding pins 29 move with a clearance fit in the grooves 36 so that the first sealing member 23 may be tilted by a small angle relative to the central axis 3. For this purpose is useful also the engagement between the dome-shaped sealing face 32 and the frusto conical sealing face 31, because in this design of the sealing faces 31, 32 the linear sealing contact between the spherical face 32 and the conical face 31 is retained even in the case of relative displacement of the first sealing member 23 with respect to the second sealing member 25.

Between the pins 29 extend radially outwardly extending tongues 37 for supporting the spring 24. The other end of the spring 24 is supported by a snap ring 35 held in an annular groove in the bore of the housing 11. The first sealing member 23 is thereby biased in axial direction to the right and presses the sealing faces 31, 32 together, while the second sealing member 25 has on the outside a radially projecting shoulder 42 which gets into contact with a radially inwardly projecting shoulder 43 of the axial bore in the housing 11 and forms thereby a stop for the two axially displaceable sealing members 23, 25.

As is apparent from FIG. 3, the sealing member 25 contains a forwardly biased non-return valve 26. The non-return valve 26 comprises substantially a ball 28 which is received in a seat and which is situated inside the second sealing member 25. In the illustrated state the spring 27 exerts a greater biasing force than the spring 24. This means, specifically, that when pressure is admitted into the axial bore of the housing 11 and acts thereby also on the non-return valve 26 and the second sealing member 25, first both the sealing members 25, 23 move to the left whereby the spring 24 is compressed but the spring 27 retains its position. Only when, after axial movement of the sealing members 23, 25, the sealing face 22 of the sealing member 23 contacts the opposite sealing face 21, subsequent increase of the pressure of the supplied fluid may open the valve 26 to shift the ball 28 to the left against the pressure of the spring 27. In this state the flushing medium and/or coolant may flow through the radial bore 38 in the housing 11 and the passage formed by the axial bores 39, 40, 41 of the sealing members 23, 25 and of the drawbar 2 to the front end of the shaft 1 in order to operate the clamping mechanism (not shown).

As regards the positions of the individual elements illustrated in FIG. 3, in connection with the chuck according to the invention, the drawbar 2 or its sealing face 21 is not in contact with the sealing face 22 when the sealing members 23, 25 are in their outermost right-hand stopping position. A clearance s' of about 0.5–2.5 mm exists in this position between the sealing faces 21, 22, as is clearly apparent from FIG. 2A. During the transfer of fluid this spacing is closed by the compression of the spring 24 and displacement of the sealing members 23, 25 to the left, as soon as the pressure exerted by the fluid is sufficient to compress the spring 24. After the contact of the sealing faces 21, 22 has been established, the non-return valve 26 opens when the pressure further increases.

Obviously, numerous modifications and variations of the present invention are possible in the light of the above teachings. It is therefore to be understood that within the scope of the appended claims, the invention may be practised otherwise than as specifically described herein.

What is claimed is:

1. A spindle assembly comprising:
   a hollow shaft extending along and rotatable about an axis;
   a clamping bar parallel to and rotatable with the shaft and axially displaceable relative to the shaft to clamp and release an object carried on the shaft; and
   a rotary union including
      a union housing nonrotatable about the axis,
      an annular bar seal face on the clamping bar,
      a sealing member axially movable in the union housing independently of the bar seal face, forming a pressurizable space with the union housing, and having an annular member seal face axially confronting and axially engageable with the bar seal face, the seal faces forming a portion of a passage extending from the space along the clamping bar and shaft to the object, means
      means inhibiting rotation of the sealing member about the axis relative to the union housing,
      means braced between the union housing and the sealing member for biasing the sealing member axially away from the bar seal face with a predetermined biasing force, and
      means for pressurizing the space with a fluid and thereby pressing the member seal face against the bar seal face, whereby the fluid moves along the passage to the object.

2. The spindle assembly defined in claim 1, further comprising
   a check valve in the rotary union in the passage and having
      a seat on the sealing member directed toward the bar seal face,
      a valve body movable axially into and out of blocking engagement with the seat, and
      a spring urging the valve body away from the bar seal face into blocking engagement with the seat with a predetermined force that is more than the predetermined biasing force, whereby pressurization of the passage upstream of the check valve first displaces the sealing member against the bar seal face and then displaces the valve body off the seat.

3. The spindle assembly defined in claim 2 wherein the sealing member includes
   an outer part having an outer end forming the member seal face and an inner end and
   an inner part having an inner end formed with the seat and an outer end fitting with the inner end of the outer part.

4. The spindle assembly defined in claim 3 wherein the inner end of the outer part and the outer end of the inner part are formed as annular surfaces centered on the axis, one of the annular surfaces being dome shaped and being capable of tipping limitedly about the axis relative to the other of the annular surfaces.

5. The spindle assembly defined in claim 1 wherein the union housing receives the sealing member with play such that the sealing member can tip limitedly relative to the axis in the union housing.

6. The spindle assembly defined in claim 1 wherein the sealing member is tubular and generally centered on the axis.

7. The spindle assembly defined in claim 1 wherein the clamping bar is tubular and forms a downstream portion of the passage.

8. The spindle assembly defined in claim 1 further comprising
means including a fluid-powered piston-and-cylinder unit having one side braced axially in one direction against the clamping bar and an other side braced axially in the opposite direction against the shaft and expandable to axially relatively displace the shaft and clamping bar.

9. The spindle assembly defined in claim 8, further comprising
a stationary main housing at the axis;
a secondary housing nonrotatable about the axis, limitedly axially displaceable relative to the main housing, carrying the union housing, forming a cylinder around inner ends of the clamping bar and shaft, and axially engageable with one of the inner ends; and
a piston carried on the other of the inner ends and axially displaceable in the cylinder, the piston and cylinder forming the unit.

10. The spindle assembly defined in claim 9 wherein the other inner end is formed with a plurality of radially outwardly extending projections and the piston is formed with a plurality of radially inwardly extending projections axially engageable with the projections of the other inner end and forming a bayonet coupling therewith.

11. The spindle assembly defined in claim 1 wherein the means inhibiting rotation of the sealing member includes at least one rod extending axially from the union housing, the sealing member being formed with at least one axially extending recess loosely receiving the rod.

* * * * *